(12) United States Patent
Huang et al.

(10) Patent No.: US 6,373,832 B1
(45) Date of Patent: Apr. 16, 2002

(54) CODE DIVISION MULTIPLE ACCESS COMMUNICATION WITH ENHANCED MULTIPATH DIVERSITY

(75) Inventors: Howard C. Huang; Laurence Eugene Mailaender, both of Hoboken; Giovanni Vannucci, Middletown Township Monmouth County, all of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/108,775

(22) Filed: Jul. 2, 1998

(51) Int. Cl.[7] .............................................. H04B 7/216
(52) U.S. Cl. ........................ 370/342; 375/267; 455/69; 455/101
(58) Field of Search ................................. 370/334, 335, 370/342, 414, 479; 375/221, 267, 299, 349; 455/88, 68, 69–500, 504, 506, 65, 70, 78, 562, 101

(56) References Cited

U.S. PATENT DOCUMENTS

| | | | |
|---|---|---|---|
| 3,829,777 A | | 8/1974 | Muratani et al. ............... 325/4 |
| 5,280,472 A | | 1/1994 | Glihousen et al. ............. 370/18 |
| 5,507,035 A | * | 4/1996 | Bantz et al. ................. 455/133 |
| 5,513,176 A | * | 4/1996 | Dean et al. .................. 370/335 |
| 5,574,989 A | | 11/1996 | Watson et al. ............... 455/101 |
| 5,648,968 A | * | 7/1997 | Reudink ...................... 370/335 |
| 5,781,541 A | * | 7/1998 | Schneider .................... 370/335 |
| 5,842,118 A | * | 11/1998 | Wood, Jr. .................... 455/101 |
| 5,886,987 A | * | 3/1999 | Yoshida et al. ............... 370/318 |
| 6,061,388 A | * | 5/2000 | Saulnier et al. .............. 375/200 |
| 6,131,016 A | * | 10/2000 | Greenstein et al. ........... 455/69 |

* cited by examiner

Primary Examiner—Melvin Marcelo
Assistant Examiner—Jasper Kwoh
(74) Attorney, Agent, or Firm—Wilford L. Wisner (57) ABSTRACT

A system, a transceiver, and methods for code division multiple access (CDMA) communication. The system includes first and second code division multiple access transceivers. The first code division multiple access transceiver has a plurality of antennas disposed to provide transmission via a plurality of paths and the second code division multiple access transceiver has a rake arrangement for processing a plurality of signals received at the rake arrangement with differing delays or other characteristics. A driving arrangement is provided for causing the first code division multiple access transceiver to use a relative few, e.g., one, of the plurality of antennas. When, however, an indication is obtained that an adequate number of resolvable signals are likely not received at the rake arrangement of the second transceiver, a circuit switches the driving arrangement to cause the first transceiver to use more of the plurality of antennas. In one implementation, the second transceiver sends a feedback signal indicating the number of useful signals being received and the first transceiver responds to the feedback signal by selecting and using a desirable number of transmit antennas. In an implementation suitable for a time-division duplexing (TDD) communication system, the first transceiver obtains the indication by inference from the fact that it is not receiving an adequate plurality of resolvable signals from the second transceiver. When the first transceiver obtains the indication, it drives the increased number of antennas either with respective delays or with different codes of the CDMA type.

27 Claims, 6 Drawing Sheets

*FIG. 3*
SEARCHER

CODE DIVISION MULTIPLE ACCESS COMMUNICATION WITH ENHANCED MULTIPATH DIVERSITY

BACKGROUND OF THE INVENTION

1. Field of the Invention

This invention relates to code division multiple access communication systems, code division multiple access transceivers, and to methods for operating them.

2. Discussion of the Related Art

Code Division Multiple Access (CDMA) has become one of the major technologies for digital wireless communications in the U.S. and worldwide. Growing demand for the service provided by CDMA has created a need for expanded data rates and higher system capacity. Working against the expansion of system capacity is the problem that some users may receive an inferior signal because of multipath fading that is a property of the particular channel in use. However, signal quality is improved by the use of diversity reception, in which multipath fading of a particular signal is overcome by receiving and combining two or more reflections of the signal. This technique works when two or more reflections are sufficiently separated in time so that they can be resolved, that is, distinguished and separated at the receiver. This desirable situation depends on the presence of radio reflections generated by the environment.

However, for some users in a CDMA system no set of resolvable signals ("no resolvable multipath") will exist. For example, this will occur at a particular receiver if the delay spread among the received reflections of the signal is less than one 'chip' duration. In this art, a 'chip' is a characteristic duration that is approximately equal to the inverse of the system bandwidth. When the delay spread among received reflections is less than one chip, the receiver cannot adequately distinguish and separate the signal reflections and therefore can provide no reduction in signal fading. This adverse situation can arise in both indoor and outdoor cellular systems. While it has been proposed to increase transmitter power to avoid such situations, such a tactic greatly reduces system capacity and increases interference. Alternatively, it is known that transmission diversity can be used, but in such proposed systems the cost in terms of reducing system capacity and increasing interference is significant.

SUMMARY OF THE INVENTION

According to the present invention, in a code division multiple access communication system, a first transceiver has on its transmitter side a plurality of antennas disposed to provide transmission using a plurality of paths; and a second transceiver has on its receiver side a "rake" arrangement for processing a multiplicity of received signal versions. Relatively few, ordinarily, one, of the plurality of antennas in the first transceiver is used normally. When, however, the first transceiver obtains an indication that the receiver of the second transceiver is not receiving a sufficient number of resolvable signal versions, the first transceiver is switched to use more of the plurality of antennas. Thus, multipath fading is overcome and the capacity of the system is favorably affected, in that it is not necessary to increase total transmitted power and the diversity order is not increased unnecessarily for those users already obtaining adequate diversity signals through the radio-reflective multipath environment.

A first implementation of the invention feeds back a signal from the second transceiver to provide the indication that resolvable multipath does not exist for the channel in use at its receiver side. The transmitter side of the first transceiver is then switched to use the increased number of antennas and thus provide transmission diversity of signals transmitted to the second transceiver.

A second implementation of the invention provides that the first transceiver detects at its receiver side that resolvable multipath does not exist at its receiver side for the channel in use for signals from the second transceiver. The first transceiver switches its own transmitter side to provide transmission diversity of signals transmitted to the second transceiver, Under the detected condition, it is at least likely that resolvable a multipath does not exist at the receiver side of the second transceiver. Since in some systems, such as time-division duplexing (TDD) systems, the number of diversity paths on the up and down links will be identical, in the same period of time in which the first transceiver is switching, the second transceiver will have made the same adaptation. Thus, feedback is not necessary, as the requisite number of paths in both directions on the channel can be determined by each transceiver independently.

According to a further implementation of the invention, adaptive transmission diversity is provided by employing additional spreading codes, rather than delays, at the additional antennas on the transmitter side of each transceiver when no resolvable multipath exists.

According to a first aspect of the invention, a transceiver for code division multiple access communication has on its transmitter side a plurality of antennas disposed to provide transmission using a plurality of paths and on its receiver side a demodulator and demultiplexer for signals received from a remote transceiver. The transceiver has an arrangement to use relatively few, e.g., one, of the plurality of antennas normally. When, however, there is received an indication of no resolvable multipath, the arrangement switches the transceiver to use more of the plurality of antennas.

According to a second aspect of the invention, a transceiver for code division multiple access communication has on its transmitter side a signal splitter and modulator for data signals and has on its receiver side both a rake arrangement for attempting to separate a plurality of received signal versions from a remote transceiver and a searcher for searching for a plurality of resolvable signal versions. The searcher is connected from the rake arrangement to the signal splitter on the transmitter side to provide an indication signal for signal splitting whenever the searcher does not find a plurality of resolvable signal versions.

Various features of the invention reside in the particular arrangements for providing an indication signal and/or switching of antennas on a transceiver transmitter side and in the methods of operation, as will become clearer hereinafter.

BRIEF DESCRIPTION OF THE DRAWING

Further features and advantages according to both aspects of the invention will become apparent from the following detailed description, taken together with the drawing, in which.

DETAILED DESCRIPTION

The purpose of the disclosed technique is to sense which users have channels with insufficient diversity and to compensate therefor by providing diversity transmission to those users. The additional signals are generated with respective delays and with signal voltages adjusted so that constant or balanced total transmit power is achieved for any number of branches. The respective delay values of one chip and two chips must be at least that large. Each delay should differ from others by at least one chip duration. The antennas are physically spaced far apart enough (e.g., 20 wavelengths) so that independent fading paths are achieved at the receiver.

Figure 1A:
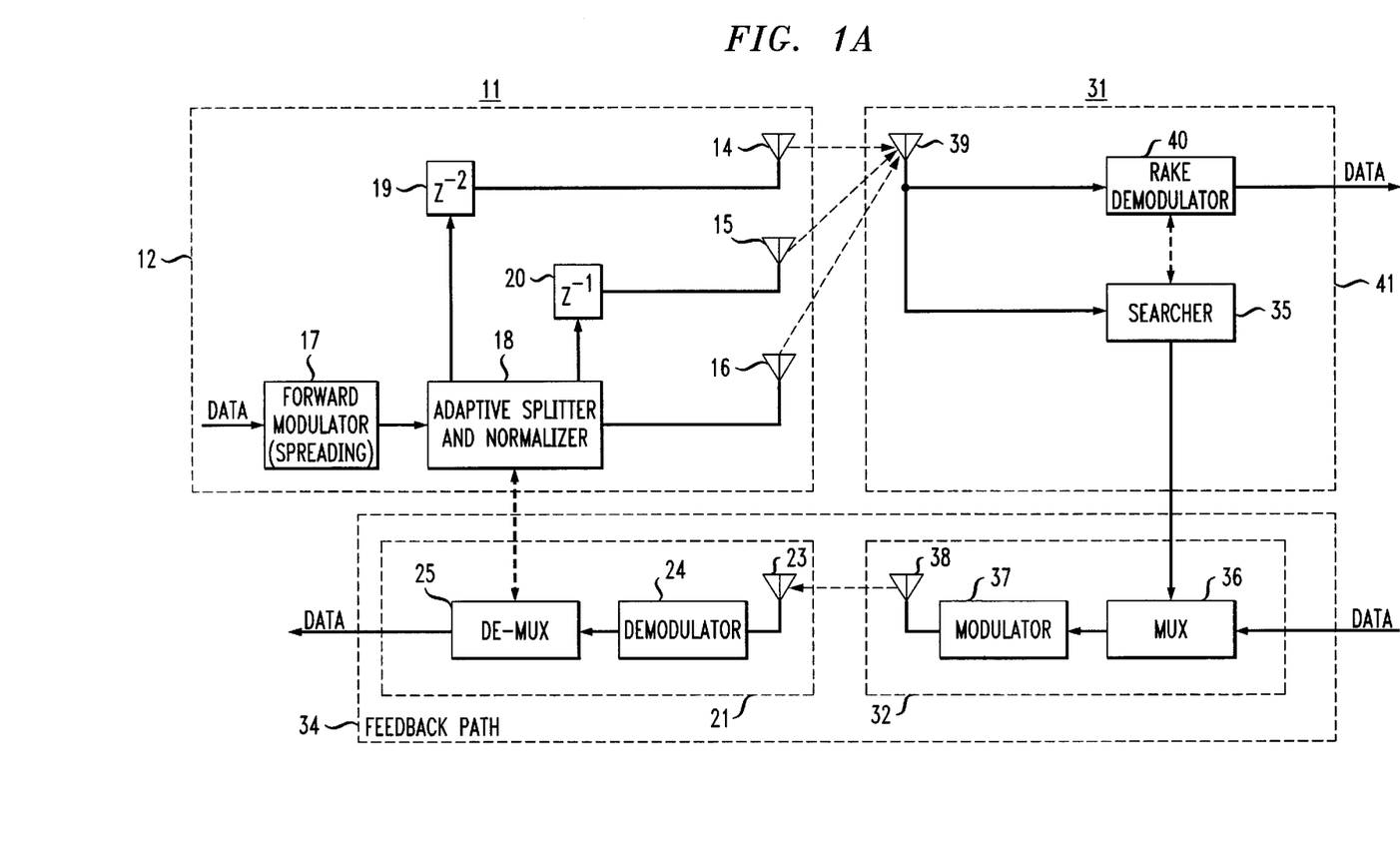
FIG. 1A is a block diagrammatic showing of a first implementation of the invention.

In FIG. 1A, a local transceiver 11 includes an arrangement for switching from the use of a single transmitter antenna, or a few such antennas, to a larger number of transmitter antennas on its transmitter side in response to an indication signal that a remote transceiver 31 is at least likely not receiving resolvable signal versions. Remote transceiver 31 has in its receiver 41 a rake arrangement and a searcher for searching for resolvable versions of a received signal. A connection to the transmitter side of transceiver 31 supplies, for multiplexing purposes, the indication signal that resolvable signal versions are not being received whenever that is the case. Transceivers 11 and 31 are illustratively not identical when transceiver 11 is a base station transceiver and transceiver 31 is a mobile transceiver. Then, transceiver 31 preferably does not carry multiple transmit antennas. In principle, however, the technique of the invention could be applied in both directions.

The local transceiver 11 has in its transmitter 12 a plurality of antennas 14, 15, and 16 for providing transmission using a plurality of paths and has in its receiver 21 an antenna 23, a demodulator 24 and a demultiplexer 25 for code division multiple access signals received from a remote transceiver 31. Illustratively, just one transmitter antenna of antennas 14, 15, and 16, e.g., antenna 16, is used under normal conditions. But when an indication is obtained that resolvable multipath does not exist, transceiver 11 includes means for 0switching transmitter 12 to use more antennas, illustratively, antennas 14 and 15 in addition to 16. In this implementation, 'resolvable multipath' refers to separable signals received via environmental reflections in different paths at remote transceiver 31, as determined by its receiver 41.

Feedback path 34 provides to transmitter 12 of transceiver 11 the indication that resolvable multipath does or does not exist at receiver 41 of transceiver 31. Feedback path 34 is indicated by the elongated dotted box in the lower portion of FIG. 1A and includes transmitter 32 of transceiver 31, receiver 21 of transceiver 11, and the radio transmission path between them.

Adaptive splitter and normalizer 18 is coupled to demultiplexer 25 in final portion of feedback path 34 to switch transmitter 12 to use more of antennas 14, 15, and 16 when it receives a signal that resolvable multipath does not exist.

Adaptive splitter and normalizer 18 feeds: (a) antenna 16 without delay, (b) antenna 15 with delay $Z^{-1}$ via delay circuit 20, and (c) antenna 14 with delay $Z^{-2}$ via delay circuit 19.

Feedback path 34 includes multiplexer 36, modulator 37, and antenna 38 in remote transmitter 32, as well as antenna 23, demodulator 24, and demultiplexer 25 in receiver 21 of local transceiver 11. In its initial portion, feedback path 34 is coupled in receiver 41 of remote transceiver 31 to searcher 35, which provides to multiplexer 36 in transmitter 32 a signal representative of the number of resolvable signal versions. Searcher 35 is coupled to antenna 39 and rake demodulator 40 to derive the number of resolvable received signals and to supply a signal reporting that number to feedback path 34 at multiplexer 36. The feedback path further includes in local transceiver 11 a connection from demultiplexer 25 in receiver 21 to adaptive splitter and normalizer 18 in transmitter 12 of local transceiver 11.

Demultiplexer 25 is coupled to adaptive splitter and normalizer 18 to supply the pertinent feedback signal to adaptive splitter and normalizer 18. Adaptive splitter and normalizer 18 splits the modulated data signal from forward modulator 17 into multiple parts for the increased number of antennas and normalizes them so that total transmitted power of transceiver 11 is not increased.

For the other direction of communication, that is from transceiver 31 to transceiver 11, the forward modulated data signal is multiplexed in transmitter 32 with the feedback signal to local transceiver 11. While transmitter 32 could be a mirror image of transmitter 12, and receiver 21 in transceiver 11 could be a mirror image of receiver 41 in transceiver 31, in general, that is not necessary. A more elaborate arrangement with some mirror image components is described hereinafter in connection with FIG. 1B.

In the operation of FIG. 1A, antenna 16 in transceiver 11 is used for transmission in the manner of a conventional CDMA transceiver, so long as the feedback signal does not indicate the failure of resolvable multipath at transceiver 31. This condition is consistent either with no signal from demultiplexer 25 or a signal from demultiplexer 25 that environmentally-provided resolvable multipath signals are being received by receiver 41 of transceiver 31. When a feedback signal indicating the failure of resolvable multipath is supplied from demultiplexer 25 to adaptive splitter and normalizer 18, then adaptive splitter and normalizer 18 activates antennas 14 and 15 through delays 19 and 20, respectively, and balances the signals at antennas 14–16. Antennas 14, 15, and 16 are spaced adequately (e.g., by 20λ) to ensure effective diversity transmission.

It should be noted that antennas 14–16, or one or more of them, as needed, are preferably simultaneously employed to transmit code division multiple access signals for a plurality of additional mobile receivers.

Receiver 21 of transceiver 11 could also monitor the presence or loss of resolvable multipath at receiver 21 through an arrangement (not shown) like that of receiver 41. Such loss of resolvable multipath may or may not coincide with loss of resolvable multipath in the other direction, as in general for CDMA systems the up-link and down-link paths need not be the same in both directions. Such an arrangement is not shown in FIG. 1A because the mobile terminal may not support multiple antennas. While three antennas are shown, it should be understood that the number of transmit antennas is adjusted for the particular channel experienced at any moment by a given user. Further, in addition to the feedback data signals as above described, it may be very desirable for some systems to transmit a delayed pilot signal for each antenna, as in an IS-95 downlink signal.

Advantageously, each receiver demodulates received signals with its standard rake arrangement, regardless of what is occurring at the remote transmitter.

Because of the operation of the present invention, the fingers of each rake demodulator are always fully exploited regardless of the environmental conditions of the channel used. The searcher 35 measures the power received at its receiver 31 for various delays, e.g., delays of a pilot signal, and reports the number of strong delays as control information. In the illustrated embodiment, this control information is sent via the feedback path 34 to the remote transceiver 11. Further, the feedback path may employ adaptive diversity control of known type.

Figure 1B:
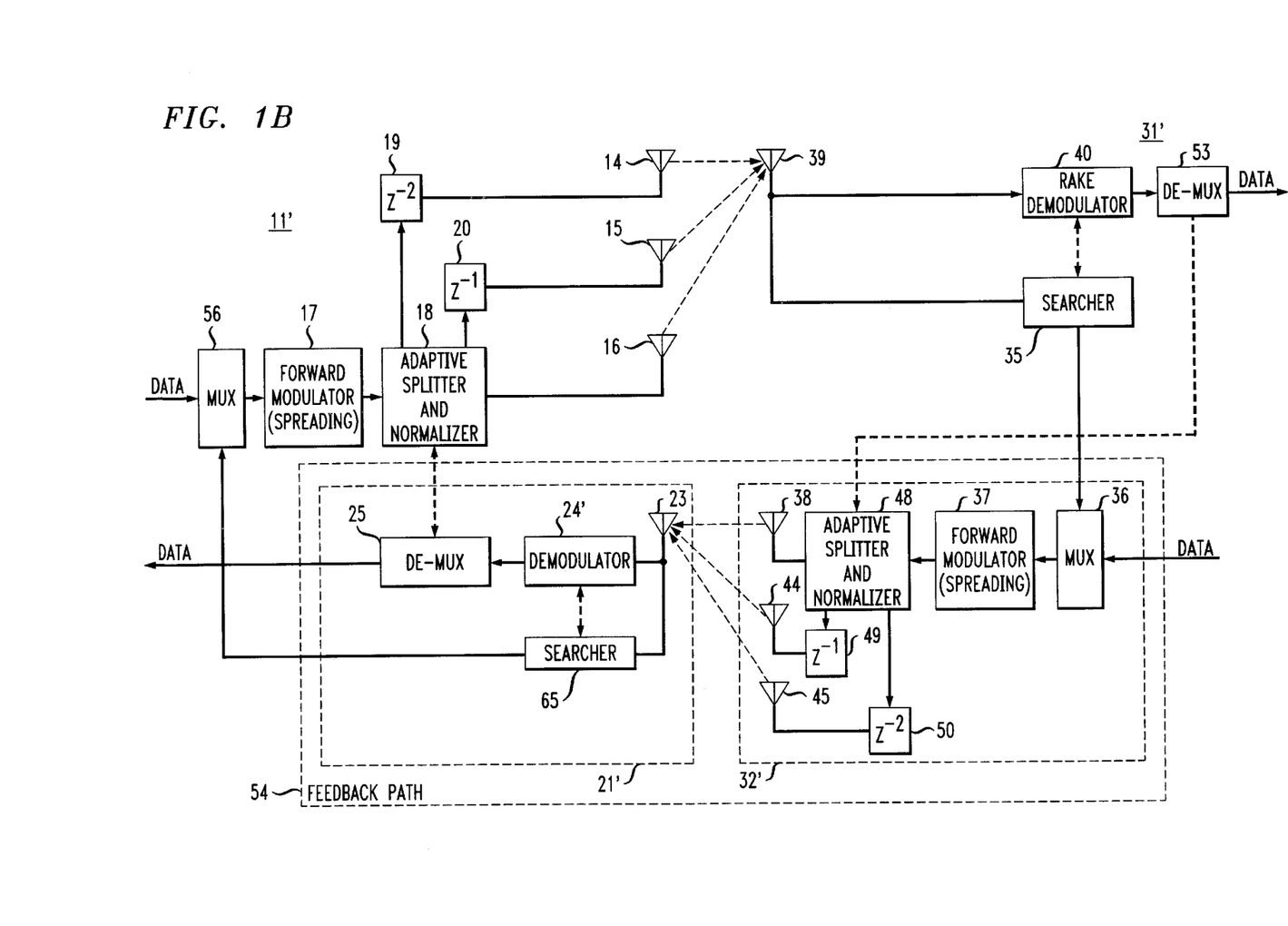
FIG. 1B is a block diagrammatic showing of a second implementation of the invention.

In the implementation of FIG. 1B, adaptive transmission diversity is employed in both directions of transmission, as may be appropriate in an indoor PBX system with relatively fixed stations using relatively low-power radio transmission. While only the lower half of FIG. 1B is designated as a feedback path, it should be clear that the upper half of FIG. 1B is also a feedback path that can supply a signal indicating to remote transceiver 31' that the local receiver 21' of local transceiver 11' is finding no resolvable multipath. For this purpose, an additional searcher 65 is employed.

Searcher 65 supplies an indication signal to multiplexer 56 upstream of forward modulator 17. Transceiver 31' responds to the indication signal that is fed back to antenna 39 by separating the indication signal in demultiplexer 53, which applies that signal to an adaptive splitter and normalizer 48 like adaptive splitter and normalizer 18. Adaptive splitter and normalizer 48 drives antenna 38 and, in response to the signal indicating failure of resolvable multipath, also drives antennas 44 and 45 through respective one-chip and two-chip delays 49 and 50. In all other respects, the components and their relationships in FIG. 1B are like those in FIG. 1A.

Figure 1C:
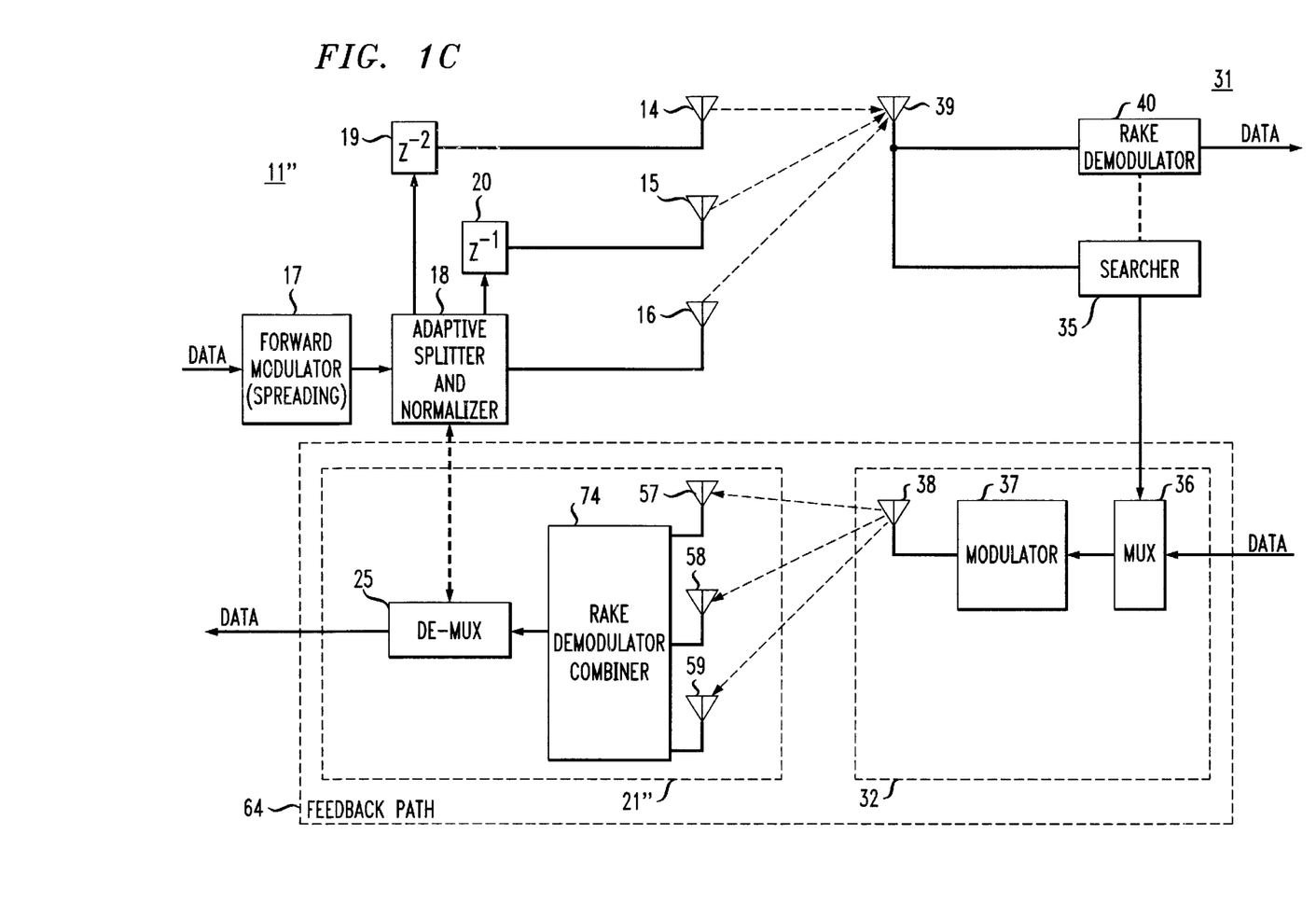
FIG. 1C is a block diagrammatic showing of a third implementation of the invention.

In the implementation of FIG. 1C, the configuration and operation of transceiver 31 remains the same as in FIG. 1A. The transceiver 11" differs from transceiver 11 of FIG. 1A in that it employs variable receive diversity when environmental conditions do not provide resolvable multipath for signals it receives. Further, the implementation of FIG. 1C deploys all antenna arrays at the base transceiver. That is, no antenna arrays are needed at the mobile, or individual user, transceivers. More specifically, transceiver 11" has rake demodulator-combiner 74 connected from physically separated diversity reception antennas 57, 58, and 59 to demultiplexer 25. The receiver 21" of transceiver 11" gets spatial diversity when temporal diversity at its receiver side is not available. Further, any rake-demodulator it has (not shown) can be kept fully utilized. The operation of antenna array 57, 58, and 59 is independent of the operation of antenna array 14, 15, and 16. In all other respects, the components and their relationships in FIG. 1C are like those in FIG. 1A.

Figure 2:
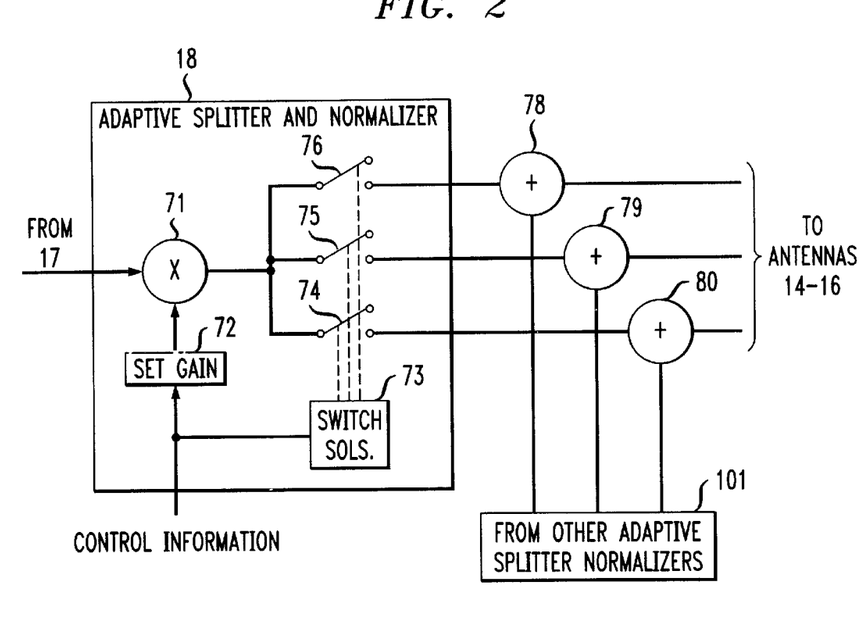
FIG. 2 is a partially schematic and partially block diagrammatic showing of an implementation of the adaptive splitter and normalizer of FIGS. 1A–1C.

In FIG. 2 is shown one embodiment for adaptive splitter and normalizer 18. The modulated signal from modulator 17 is applied to multiplier 71, where it is multiplied by a signal from a gain setting circuit 72. Circuit 72 provides the power normalization for the number of active antennas, as derived from the feedback path control signal. The switch solenoids or solid-state switch drivers 73 individually and selectively activate the appropriate switch or switches 74–76 to activate the appropriate number of antennas according to the control signal. Summers 78–80 are inserted in the antennas paths because, at least where used in a mobile communication base station, the same antennas may be sending signals to other users. Each user requires an individual splitter-normalizer 101.

Figure 3:
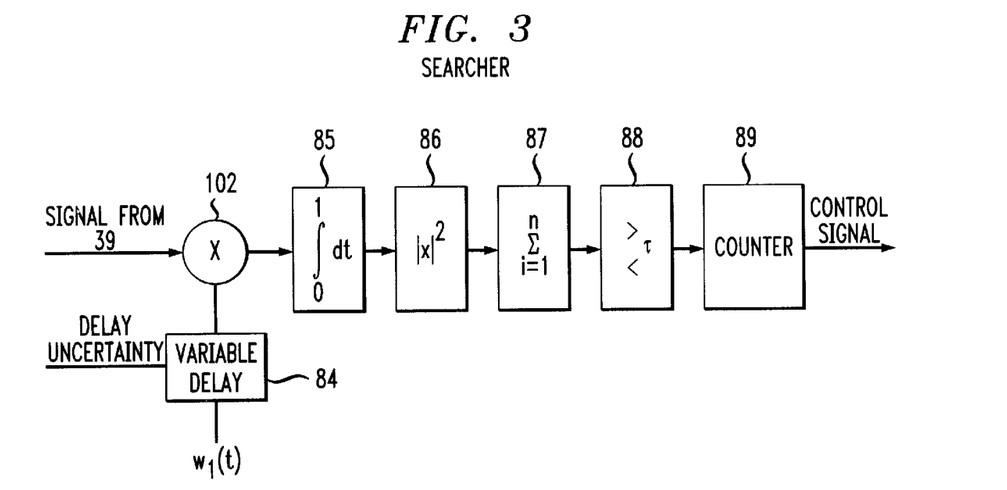
FIG. 3 is a partially schematic and partially block diagrammatic showing of an implementation of the searcher of FIGS. 1A–1C.

FIG. 3 shows an appropriate configuration for searcher 35, for which other configurations are known in the art. The received signal at antenna 39 is multiplied at multiplier 102 with a nominal matching waveform $W_j(t)$, such as a particular Walsh code combined with a particular random spreading sequence, at a plurality of possible arrival delays 84, The result is thereafter integrated, e.g., by the integration circuit 85, as is well-known in the art. Squarer 86 squares the result of the integration to estimate the energy, which summer 87 sums to give a medium term average. For each possible delay, these energies are compared to a threshold in threshold circuit 88. Counter 89 counts the number of delays whose energies exceed the threshold. This number, the number of strong paths, is fed back as a control information signal to the remote transmitting station.

Figure 4:
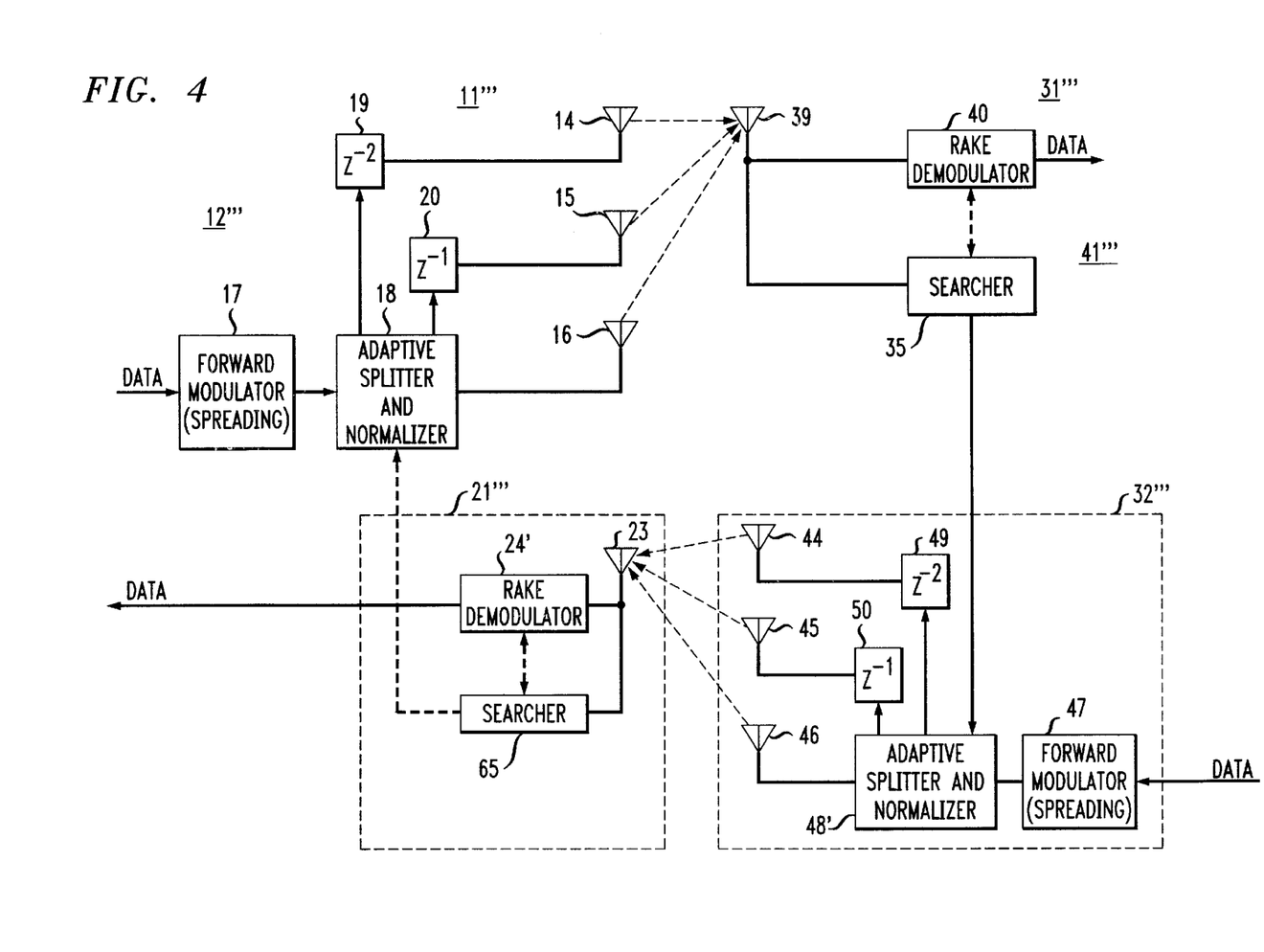
FIG. 4 is a block diagrammatic showing of a fourth implementation of the invention.

In the implementation of FIG. 4, a feedback path such as feedback path 34 of FIG. 1A or feedback path 54 of FIG. 1B is not employed. For example, this alternative may be appropriate if transceiver 11'" and 31'" are used in a TDD system or in another system in which the number of diversity paths on the up and down links will be identical. In this instance, each transceiver 11'", 31'" determines the existence of resolvable multipath independently based on the assumption that the transmission conditions in both directions are identical.

More specifically, in transceiver 11'", when rake demodulator 24' and searcher 65 do not find a sufficient number of resolvable multipath signals received at antenna 23 of receiver 21'", adaptive splitter and normalizer 18 of receiver 12'" supplies signals to antennas 14 and 15 through delay circuits 19 and 20 and to antenna 16. This response provides transmission diversity to transceiver 31'". This action occurs even though no feedback signal is available from transceiver 31'". Likewise, in transceiver 31'", when rake demodulator 40 and searcher 35 do not find a sufficient number of resolvable multipath signals received at antenna 39 of receiver 41'", adaptive splitter and normalizer 48' supplies signals through delay circuits 49 and 50 to antennas 44 and 45 and to antenna 46. This response provides transmission diversity to transceiver 11'". This action occurs even though no feedback signal is available from transceiver 11'".

All other components and connections in FIG. 4 are the same as like numbered ones in FIGS. 1A–1C, 2, and 3, or adapted from similarly numbered ones in those figures. FIG. 4 differs from FIG. 1A in it lacks the feedback path and in the connection of searcher 65 in transceiver 11'" to adapter splitter and normalizer 18 and in the connection of searcher 35 in transceiver 31'" to adaptive splitter and normalizer 48. If the up and down links are identical, the switching to provide additional diversity should be accomplished essentially simultaneously without feedback information.

Figure 5:
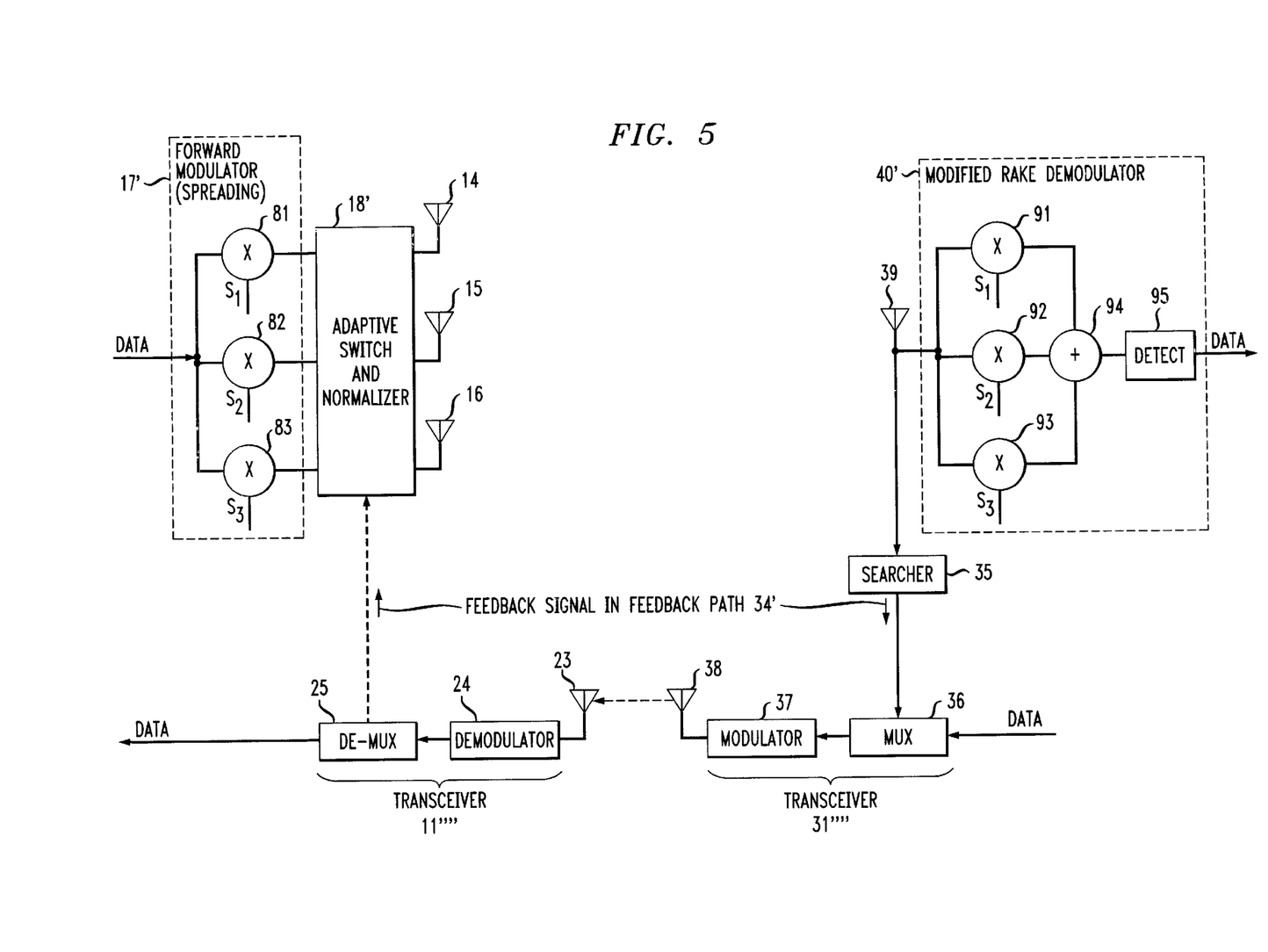
FIG. 5 is a block diagrammatic showing of a fifth implementation of the invention.

In FIG. 5 is shown an implementation of the concept that additional diversity can be provided by the use of additional spreading codes at the separate antennas, instead of using different delays. FIG. 5 is arranged similarly to FIGS. 1A–1C and includes many of the same components, except for the absence of the delays. In the implementation of FIG. 5, additional diversity signals are supplied on different spreading codes. An original code $S_1$ is assumed, and additional codes $S_2$ and $S_3$ are given for illustration. In transceiver 11"", separate branches are formed in modified forward modulator 17' prior to spreading by code division modulators 81–83, and a unique spreading sequence is assigned to each antenna. Forward modulator 47' is similarly modified. Adaptive switch and normalizer 18' provides power normalization and antenna switching. Rake demodulators 40' and 24' are modified from the corresponding ones of FIG. 1. They include, for example, multipliers 91–93, as well as adder 94 and detect circuit 95.

In general, the method of the invention as applied in the implementation of FIG. 5 involves supplying additional diversity signals at a transceiver transmitter only when the transmitter has obtained an indication that resolvable multipath does not exist at the remote receiver. In that event, the same data signal is simultaneously modulated onto the different codes. The switch and normalizer 18', for example, selects the number of codes for this circumstance, maintaining constant power regardless of the number of codes and resulting modulated signals. These different modulated signals containing the redundant information are then sent to the widely separated antennas 14–16.

At the receiver of transceiver 31''''; the method includes using a rake arrangement, in this case, the modified rake arrangement 39, 40' to combine diversity signals from the several codes, each of which experiences independent fading, and possibly multiple delays of the same code. The searcher 35 must likewise detect all the delayed signal versions of each code. The receiver then notifies the transmitter via the feedback path how many strong signals it is receiving, and this number may be modified on the transmit side in response to the feedback via the adaptive switch and normalizer 18'. It is apparent that several codes bearing the same data are now available at the receiver of transceiver 31''''. It also should be apparent that a combined approach may be used in which delays and codes at both used to supply the diversity signals. These codes and/or results of demodulation may be combined by the rake arrangement to achieve a diversity advantage.

Further, additional spreading codes could be used instead of, or in addition to, delays in the TDD embodiment of FIG. 4.

One difference of the implementation of FIG. 5 or a modified FIG. 4 from those of FIGS. 1A–1C and previously-described FIG. 4 is that the rake arrangement must search over the best paths for several codes.

With respect to the implementations of FIGS. 1, 4, and 5, as well as various permutations and variations thereof, several mechanisms will enhance the system capacity. First, transmission to users with insufficient resolvable multipath will now require much less transmit power to achieve an acceptable error rate. Consequently, interference to other users will be reduced. The degree of this improvement depends on the fraction of users experiencing insufficient resolvable multipath. An additional subtle benefit of the invention concerns the advantageous alteration of the out-of-cell interference fading statistics. Currently, interference from the downlinks of the adjacent cells arrive at a handset via a small number of fading paths (possibly only one) and hence exhibit large variability in received power, contributing to outage. The out-of-cell interference generated by the transmission diversity exhibits reduced variability in received power and thus reduces outage.

The applicability of the principles of the present invention extends beyond the specifically-disclosed embodiments to other implementations and embodiments embraced within the appended claims and their equivalents, as will be clear to workers in this art and particularly to those who undertake to practice the invention.

What is claimed is:

1. A code division multiple access communication system, comprising:

first and second code division multiple access transceivers employing multipath diversity, the first code division multiple access transceiver having a plurality of antennas disposed to provide transmission via a plurality of paths, the second code division multiple access transceiver having a rake arrangement for processing a plurality of versions of a signal received at the rake arrangement with differing delays or differing other characteristics;

means for operating said first code division multiple access transceiver to use a subset of the plurality of antennas in the absence of an indication that an adequate plurality of resolvable multipath versions of the signal are not received at the rake arrangement of the second code division multiple access transceiver; and means for switching said first code division multiple access transceiver to use more of the plurality of antennas when an indication is obtained that an adequate plurality of resolvable multipath versions of the signal are not received at the rake arrangement of the second code division multiple access transceiver, said switching means comprising means for providing a feedback signal from the second code division multiple access transceiver to the first code division multiple access transceiver to provide the indication that the adequate plurality of resolvable multipath versions of the signal are not received at the rake arrangement of the second code division multiple access transceiver.

2. The code division multiple access communication system according to claim 1, wherein the first code division multiple access transceiver is a base station transceiver and the second code division multiple access transceiver is a mobile transceiver.

3. The code division multiple access communication system according to claim 2, further including means for driving the plurality of antennas of the base station transceiver with respective delays.

4. The code division multiple access communication system according to claim 2, further including means for driving the plurality of antennas of the base station transceiver with respective spreading codes.

5. A transceiver for code division multiple access communication, comprising:

on the transmitter side of the transceiver, a plurality of antennas disposed to provide transmission using a plurality of paths to provide multipath diversity;

on the receiver side of the transceiver, a demodulator and demultiplexer for signals received from a remote transceiver;

means for operating the transmitter side of the transceiver to use a subset of the plurality of antennas in the absence of an indication that an adequate plurality of resolvable multipath signal versions are not received at the remote transceiver; and means for switching the transceiver to use at least one more antenna of the plurality of antennas than is used in said subset when an indication is obtained that an adequate plurality of resolvable multipath signal versions are not received at the remote transceiver, comprising means for responding to a feedback signal from the remote transceiver providing the indication that an adequate plurality of resolvable multipath signal versions are not received at the remote transceiver.

6. The transceiver according to claim 5 that is a base station transceiver.

7. The transceiver according to claim 6, wherein the means for responding to the feedback signal from the remote transceiver comprises an adaptive splitter and normalizer connected from the demodulator and demultiplexer to the plurality of antennas.

8. The transceiver according to claim 6, further including, on its receiver side, a plurality of antennas, and wherein the demodulator is a rake demodulator-combiner connecting the plurality of antennas on its receiver side to the demultiplexer for diversity reception.

9. The transceiver according to claim 8, wherein the means for switching the transceiver comprises, on the transmitter side, an adaptive splitter and normalizer connected to the plurality of antennas.

10. The transceiver according to claim 5, further including means for driving the plurality of antennas with respective delays.

11. The transceiver according to claim 5, further including means for driving the plurality of antennas with respective spreading codes.

12. A method for operating first and second transceivers for code division multiple access communication, the first transceiver having on the transmitter side of the transceiver a plurality of antennas disposed to provide transmission employing multipath diversity using a plurality of paths and, on the receiver side of the transceiver, a demodulator and demultiplexer for signals received from the second transceiver, comprising the steps of:
   operating the transmitter side of the first transceiver to use a subset of the plurality of antennas in the absence of an indication that a signal transmitted from the transmitter side does not provide an adequate plurality of resolvable multipath signal versions at the second transceiver; and
   switching the transmitter side of the first transceiver to use more of the plurality of antennas when an indication is obtained that the signal transmitted from the transmitter side does not provide an adequate plurality of resolvable multipath signal versions at the second transceiver, comprising the step of responding to a feedback signal from the second transceiver providing the indication that the second transceiver is not receiving the adequate plurality of resolvable multipath signal versions.

13. The method of operating first and second transceivers according to claim 12, wherein the first transceiver is operated as a base station transceiver, the second transceiver being operated as a mobile transceiver.

14. The method of operating first and second transceivers according to claim 13, wherein the step of responding to a signal from the second transceiver comprises adaptively splitting and normalizing a modulated data signal for transmission from the plurality of antennas.

15. The method of operating first and second transceivers according to claim 13, further including the step of providing diversity reception for signals from the second transceiver.

16. The method of operating a transceiver according to claim 12, further including the step of driving the plurality of antennas with respective delays.

17. The method of operating first and second transceivers according to claim 12, further including the step of driving the plurality of antennas with respective spreading codes.

18. A method for operating a code division multiple access communication system including first and second code division multiple access transceivers, the first code division multiple access transceiver having a transmitter side having a plurality antennas disposed to provide transmission employing multipath diversity via a plurality of paths, the second code division multiple access transceiver having a receiver side having a rake arrangement for processing a plurality of multipath versions of a signal received at the rake arrangement with differing delays or differing other characteristics, the method comprising the steps of:
   operating the transmitter side of the first code division multiple access transceiver to use a subset of the plurality of antennas in the absence of an indication that resolvable multipath is not obtained at the rake arrangement of the second code division multiple access transceiver; and
   switching the transmitter side of the first code division multiple access transceiver to use at least one more antenna of the plurality of antennas than is used in said subset when an indication is obtained that resolvable multipath is not obtained at the rake arrangement of the second code division multiple access transmitter, comprising the step of providing a feedback signal from the second code division multiple access transceiver to the first code division multiple access transceiver to provide the indication that resolvable multipath is not obtained at the rake arrangement of the second code division multiple access transmitter.

19. The method of operating a code division multiple access communication system according to claim 18, wherein the step of operating the first code division multiple access transceiver comprises operating it as a base station transceiver, the method further including the step of operating the second code division multiple access transceiver as a mobile transceiver.

20. The method of operating a code division multiple access communication system according to claim 18, further including the step of driving the increased number of antennas with respective delays.

21. The method for operating a code division multiple access communication system according to claim 18, further including the step of driving the increased number of antennas with respective spreading codes.

22. A mobile transceiver for code division multiple access communication employing multipath diversity, comprising:
   on the transmitter side of the mobile transceiver, a multiplexer and modulator for data signals;
   on the receiver side of the mobile transceiver, a rake arrangement for separating a plurality of multipath versions of a signal received from a remote base station transceiver; and
   a searcher connected from the rake arrangement to the multiplexer to provide a feedback signal for multiplexing for transmission to the remote base station transceiver whenever the searcher does not find resolvable multipath at the rake arrangement, the feedback signal indicating absence of resolvable multipath.

23. A method for operating a mobile transceiver for code division multiple access communication employing multipath diversity, comprising the steps of:
   multiplexing and modulating data signals for transmission to a remote base station transceiver;
   demultiplexing and demodulating signals from the remote base station transceiver; and
   searching for a plurality of resolvable multipath signal versions from the remote base station transceiver and providing a feedback signal for the multiplexing and modulating step indicating the absence of resolvable multipath whenever a plurality of resolvable multipath signal versions are not found.

24. A method for operating a system for code division multiple access communication employing multipath diversity, comprising the steps of:
   determining the presence or absence of resolvable multipath at a receiver of a first tranceiver of two communicating transceivers;
   feeding back from a transmitter of the first transceiver to a receiver of a second transceiver of the two communicating transceivers a feedback signal indicating the lack of resolvable multipath at the first transceiver; and transmitting additional multipath signals from the second transceiver toward the first transceiver to enhance the existence of resolvable multipath at the first transceiver.

25. The method according to claim 24, wherein the step of feeding back a feedback signal comprises multiplexing said feedback signal with other signals for transmission from the transmitter of the first transceiver to the receiver of the second transceiver.

26. A system for code division multiple access communication employing multipath diversity between first and second communicating transceivers, comprising:

the first and second communicating transceivers;

means for determining that a lack of resolvable multipath exists at a receiver of the first tranceiver;

means for feeding back from a transmitter of the first transceiver to a receiver of a second transceiver of the two communicating transceivers a feedback signal indicating the lack of resolvable multipath at the first transceiver; and means for transmitting additional multipath signals from the second transceiver toward the first transceiver to enhance the existence of resolvable multipath at the first transceiver.

27. The system according to claim 26, wherein the means for feeding back a feedback signal comprises means for multiplexing said feedback signal with other signals for transmission from the transmitter of the first transceiver to the receiver of the second transceiver.

* * * * *